United States Patent
Cho

(10) Patent No.: US 7,125,023 B2
(45) Date of Patent: Oct. 24, 2006

(54) ROLLOVER PROTECTING SYSTEM FOR VEHICLE

(75) Inventor: Hyun-Jong Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 245 days.

(21) Appl. No.: 10/749,245

(22) Filed: Dec. 30, 2003

(65) Prior Publication Data

US 2005/0006166 A1  Jan. 13, 2005

(30) Foreign Application Priority Data

Jul. 10, 2003  (KR) ...................... 10-2003-0046664

(51) Int. Cl.
B60G 17/005  (2006.01)
(52) U.S. Cl. .......................... 280/5.502; 280/124.106; 152/209.16
(58) Field of Classification Search ............ 280/5.502, 280/5.521, 5.506, 5.507, 124.106; 180/282; 152/209.16, 152.1, 208, 210
See application file for complete search history.

(56) References Cited

U.S. PATENT DOCUMENTS 3,176,748 A * 4/1965 Anton ................... 152/209.11
4,993,466 A * 2/1991 Ochiai ................... 152/209.16
6,170,594 B1 * 1/2001 Gilbert ........................ 180/282
6,223,108 B1 * 4/2001 Izawa et al. .................. 701/36
6,347,802 B1 * 2/2002 Mackle et al. ........... 280/5.521
6,386,553 B1 * 5/2002 Zetterstrom ................ 280/5.51
6,634,654 B1 * 10/2003 Mackle et al. ........... 280/5.521
2002/0093152 A1 * 7/2002 Laurent et al. .......... 280/5.521

FOREIGN PATENT DOCUMENTS

| JP | 60252008 A | * 12/1985 |
| JP | 5-32113 | 2/1993 |
| JP | 2001-1720 | 1/2001 |

* cited by examiner

Primary Examiner—Paul N. Dickson
Assistant Examiner—Tiffany Webb
(74) Attorney, Agent, or Firm—Morgan Lewis & Bockius LLP

(57) ABSTRACT

A rollover protecting system for a vehicle comprising an actuator for pushing out an upper arm to an external direction of the vehicle by pivoting a pivot arm such that a tire produces a positive camber in relation to the road surface. Protruding ends are formed on a shoulder part of the tire for reducing a contact surface of the tire to the road, thereby reducing the lateral force applied to the tire and preventing an occurrence of rollover.

3 Claims, 4 Drawing Sheets

ROLLOVER PROTECTING SYSTEM FOR VEHICLE

CROSS-REFERENCE TO RELATED APPLICATIONS

This application claims priority to Korean Application No. 10-2003-0046664, filed on Jul. 10, 2003, the disclosure of which is incorporated fully herein by reference.

FIELD OF THE INVENTION

Generally, the present invention relates to a rollover protecting system for a vehicle.

BACKGROUND OF THE INVENTION

In general, a roll refers to a left or right (a width direction) motion in a vehicle. The roll of a vehicle, therefore, renders a vehicle to be inclined toward an outer wheel when the vehicle makes a turn. In particular, an extensive roll (e.g. a rollover) forces the vehicle to be out to a lateral side or to turn over. A rollover easily occurs when the gravitational center of the vehicle is high and a tread is short, such as with a high profile vehicle.

Conventionally, a plurality of sensors are used to detect whether the rollover will take place, and if so, the sensors regulate the vehicle speed by restricting a brake. A stabilizer is also used to support the vehicle in the direction of rollover or fluid may injected between a tire and road surface for inducing a lateral slip.

SUMMARY OF THE INVENTION

Embodiments of the present invention provide a rollover protecting system for a vehicle adapted to provide an excellent steering stabilization during a low speed turn and to change a camber angle and reduce contact surfaces of tires to the road for reducing lateral forces of the tires when the vehicle is in danger of being turned over due to a high speed turn.

In a preferred embodiment of the present invention, a rollover protecting system for a vehicle comprises a plurality of sensors for sensing the state of a vehicle. An electronic control unit (ECU) calculates a roll angle of a vehicle by using values inputted from the plurality of sensors. An actuator activated by the ECU adjusts a tire to a positive camber when the ECU detects an occurrence of the rollover. Protruding ends are formed on a shoulder part of the tire for contacting the road surface and reducing a lateral force of the tire while the tire is adjusted to the positive camber.

BRIEF DESCRIPTION OF THE DRAWINGS

For a better understanding of the nature and objects of the present invention, reference should be made to the following detailed description with the accompanying drawings, in which.

DETAILED DESCRIPTION OF PREFERRED EMBODIMENTS

Figure 1:
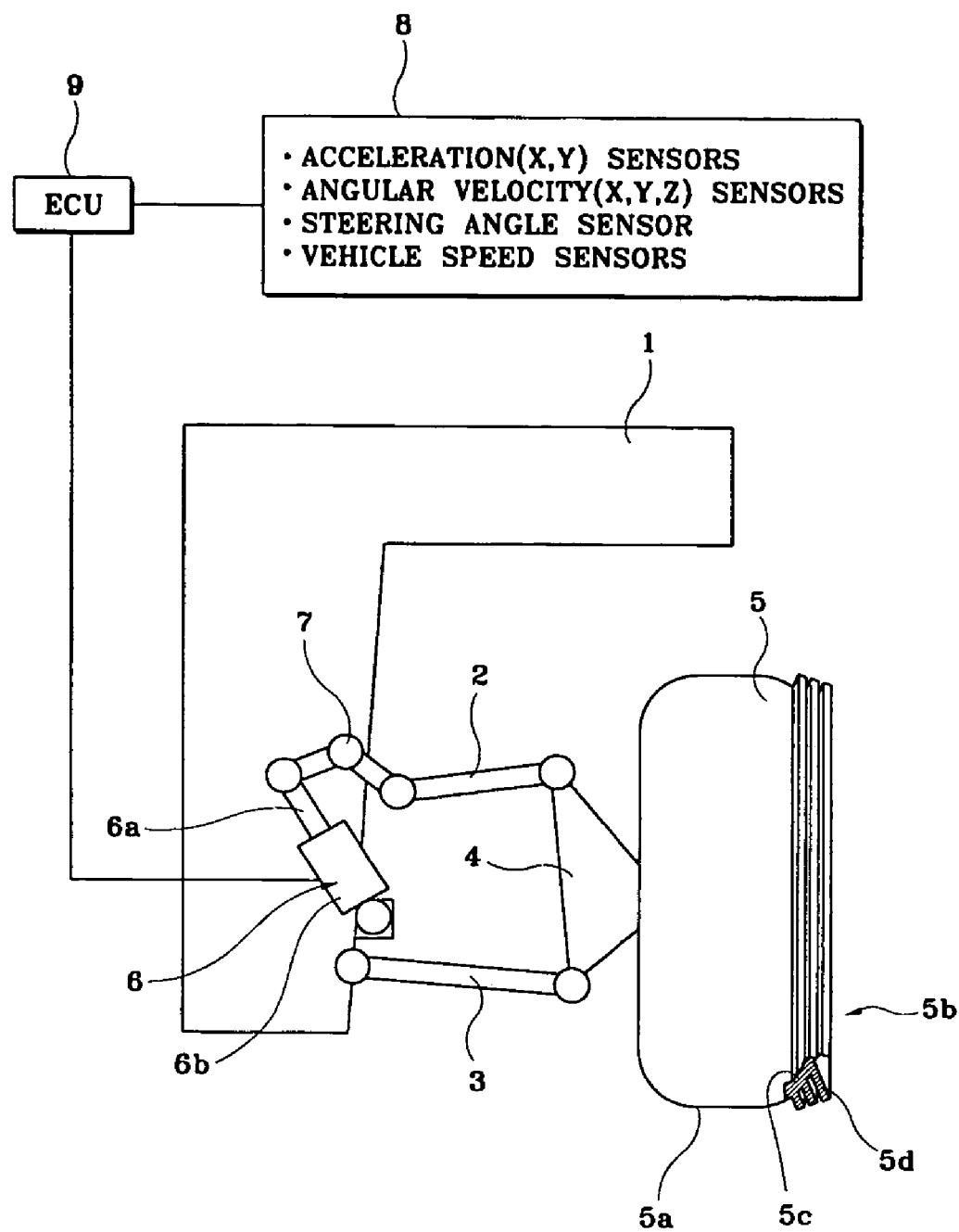
FIG. 1 is a schematic view of a rollover protecting system for a vehicle according to an embodiment of the present invention.

As shown in FIG. 1, a rollover protecting system applied to an independent suspension system comprises an upper arm 2 and a lower arm 3 pivotally mounted in relation to a vehicle body 1. A knuckle 4 pivotally couples at both ends to the upper arm 2 and lower arm 3. A tire 5 is mounted to the knuckle 4. An actuator 6 has a moving part 6a linearly sliding in relation to a fixed part 6b. The fixed part 6b of the actuator 6 is, as shown in the drawing, pivotally mounted to the vehicle body 1 at an upper side of the lower arm 3.

A pivot arm 7 is placed between the actuator 6 and the upper arm 2. The pivot arm 7 is pivotally coupled at one end to the moving part 6a of the actuator 6, while the other end thereof connects with an end of the vehicle body side of the upper arm 2. The mid-part of the pivot arm 7 is pivotally fixed to the vehicle body.

A plurality of sensors 8 (e.g. acceleration sensors for a vehicle's X, Y axes, angular velocity sensors for X, Y, and Z axes, a steering angle sensor, and vehicle speed sensors) detect roll states of the vehicle. An ECU 9 receives values measured from the sensors 8 and calculates a roll angle of the vehicle body for determining rollover.

The tire 5 is formed with a plurality of protruding ends 5d. The protruding ends 5d aligned in plural rows at a constant interval are formed on a shoulder part 5c of the tire 5, wherein the shoulder part 5c is curved and connects a tread 5a, which contacts the road, with a side wall 5b being a side part of the tire 5.

When viewed from the front of the tire 5, the protruding ends 5d take forms of rings around the shoulder part 5c (when observed at a lateral side of the vehicle), such that the protruding ends 5d and the tire 5 concentrically lie each other. The protruding ends 5d slopingly protrude out from the shoulder part 5c of the tire 5 toward the road surface. The angle of the slope of the protruding ends 5d comes to be approximately perpendicular to the road when the tire 5 is adjusted to a positive camber state via the actuator 6. Each protruding ends 5d has a rectangular cross-section and each lateral side thereof gets longer as it goes towards the side wall 5b from the tread 5a. The side wall 5b also has longer protruding ends than those of the tread 5a for allowing the tire 5 to stably contact the road when the tire is adjusted to a positive camber.

Figure 2:
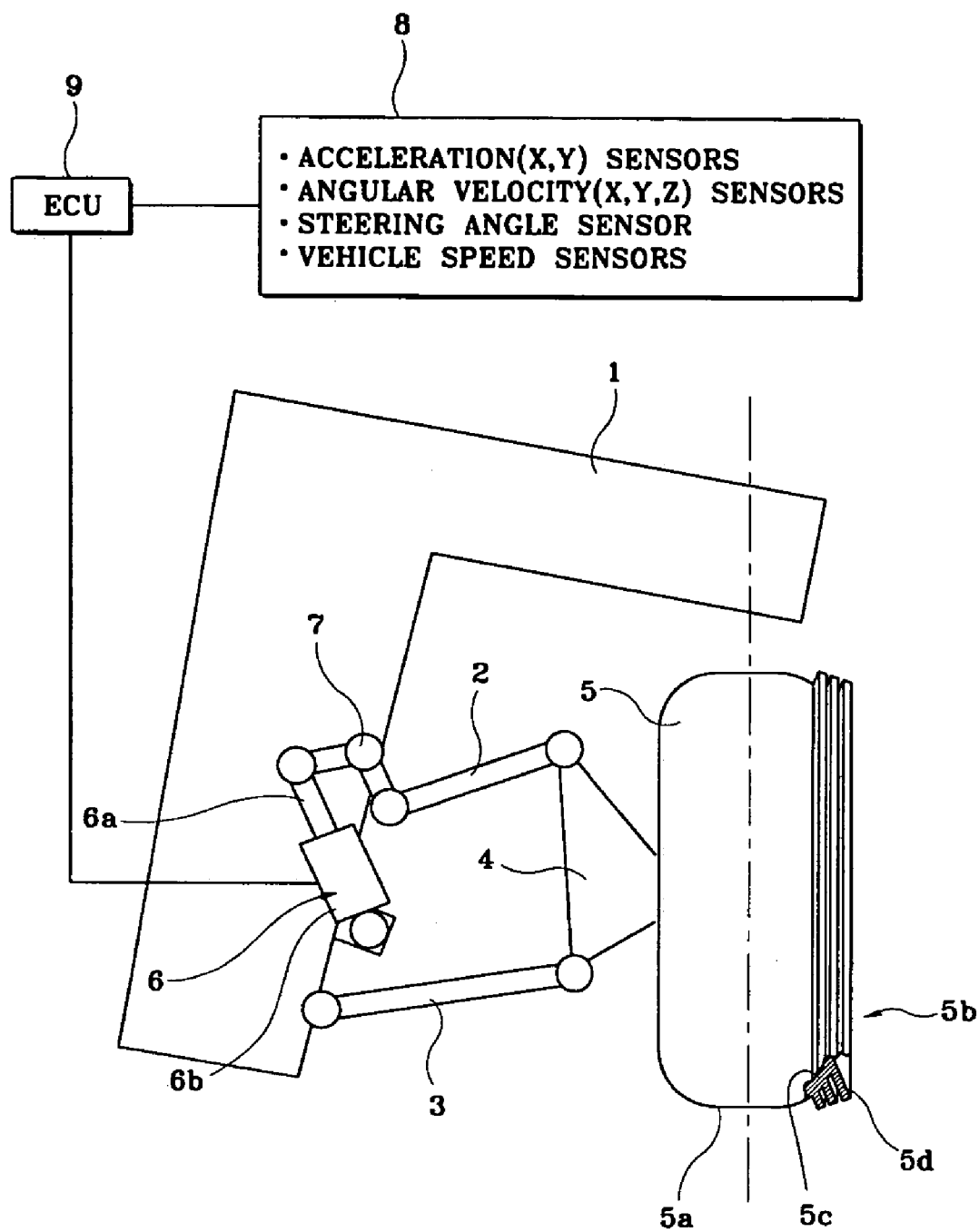
FIG. 2 illustrates a state when a rollover protecting system is not activated while a vehicle makes a turn at a low speed according to an embodiment of the present invention.

The operation and effects of the present invention will now be described. As shown in FIG. 2, when a vehicle makes a turn at a low speed, an outer wheel is made to be perpendicular to the road surface and obtain a negative camber value in relation to the vehicle body without being adjusted by the actuator 6. The tread of the tire, then, gets a relatively large contact surface, and thereby a lateral force of the tire is increased and the steering is stabilized.

Figure 3:
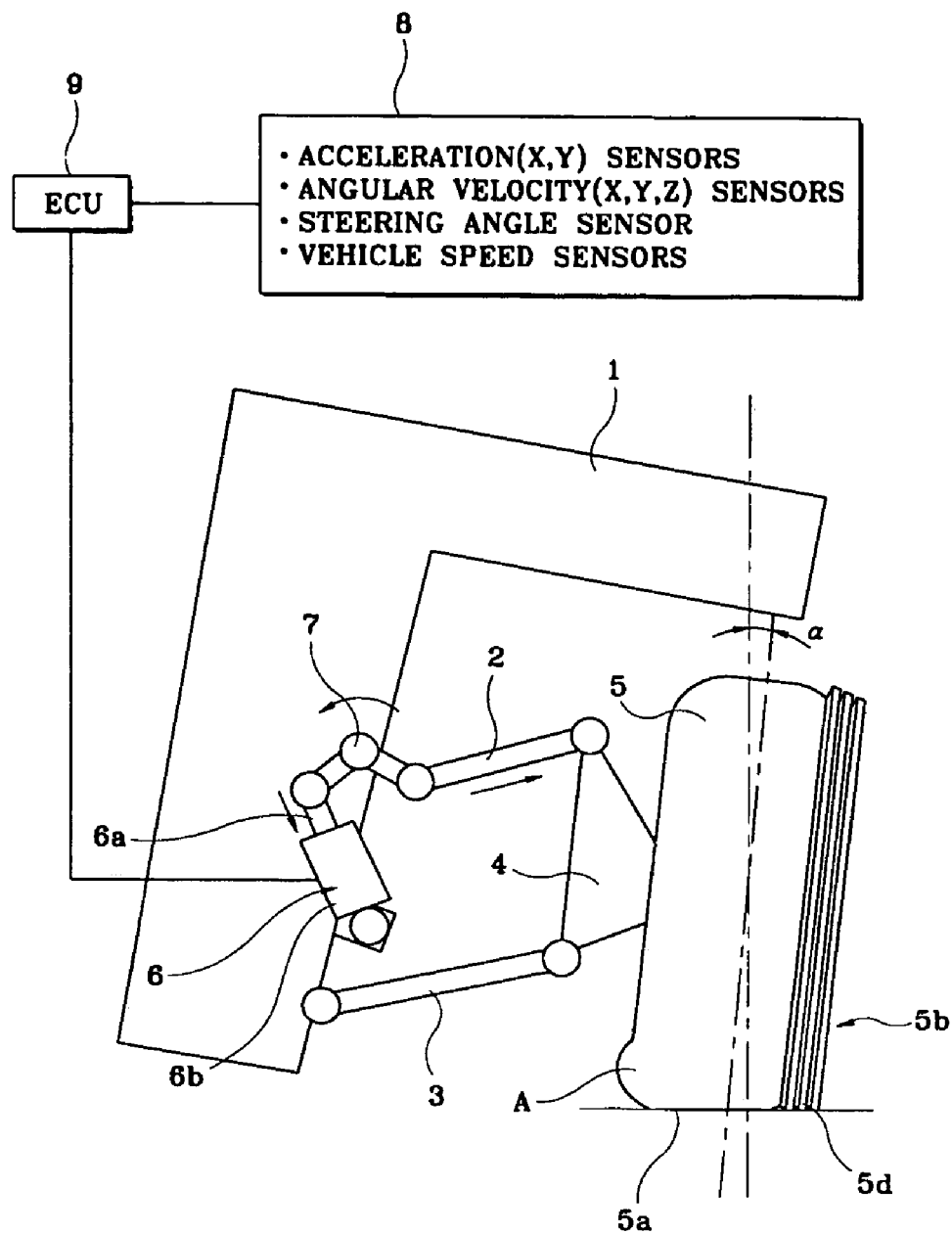
FIG. 3 illustrates a state after a rollover protecting system is activated when a vehicle makes a sharp turn according to an embodiment of the present invention.

As shown in FIG. 3, an excessive lateral force of the tire 5 deforms a bottom end of the tire 5 (deformation part A) while the vehicle makes a sharp turn. A moment is applied to the gravitational center of the vehicle in the direction of rollover by lateral forces of the tire, and if the moment is excessively given, the vehicle turns over (occurrence of the rollover). With reference to FIG. 3, the ECU 9 measures a roll angle on the basis of the motion of the vehicle body 1 and activates the actuator 6 in the event of the rollover. Provided that the rollover is detected to occur, the ECU 9 activates the actuator 6 for pulling the moving part 6a toward the fixed part 6*b*. The pivot arm 7 starts to turn in a counter-clockwise direction for pushing the upper arm 2 toward an external direction of the vehicle, so that the upper side of the knuckle 4 inclines to an external direction of the vehicle and the tire 5 changes into a positive camber state in relation to the road surface.

Figure 4:
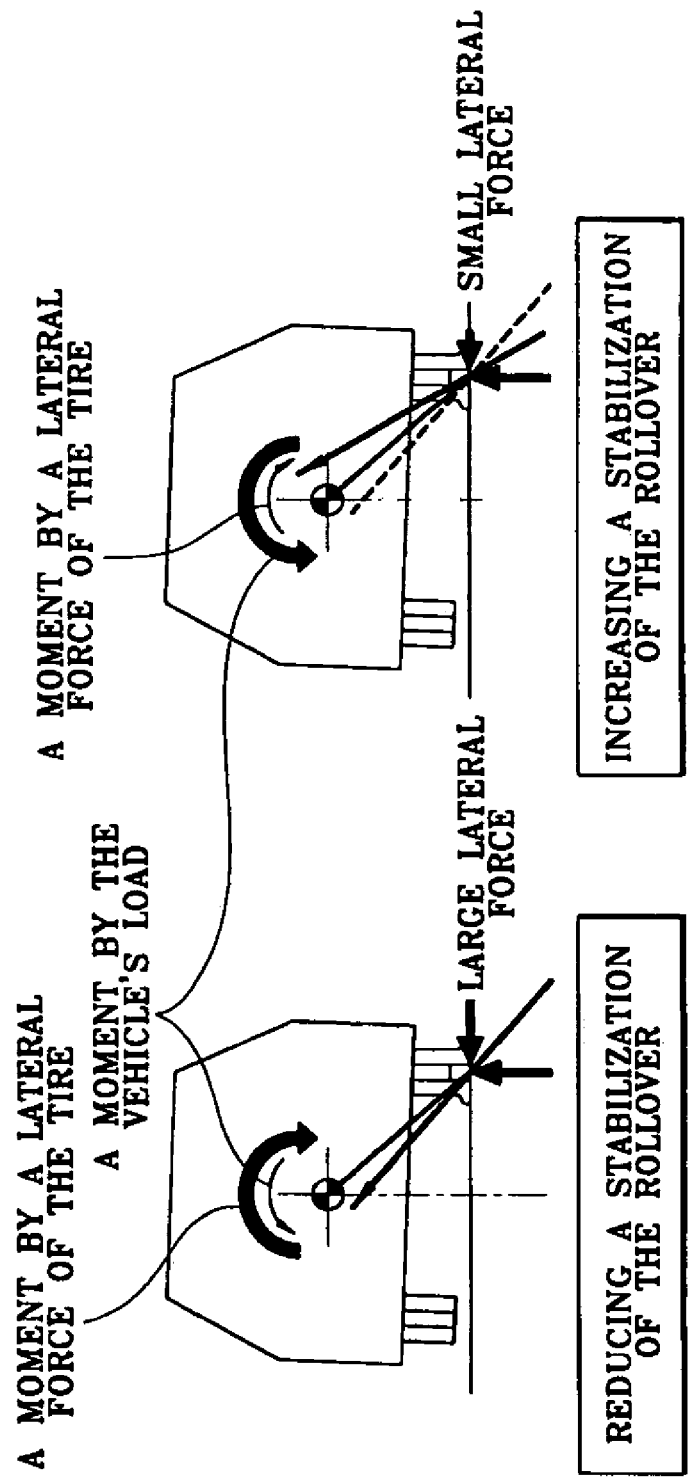
FIG. 4 illustrates comparative operation principles according to an embodiment of the present invention.

When the tire 5 produces the positive camber in relation to the road surface as described above, a contact surface of the tread 5*a* and lateral forces of the tire are respectively reduced. If the lateral force of the tire is reduced, the tire slightly slips out toward a lateral direction on the road surface, and a moment by the vehicle's load is applied larger to the gravitational center of the vehicle than a moment by a lateral force of the tire. The moment by the vehicle's load is in an opposite direction to the moment by a lateral force of the tire, thereby preventing the rollover event (see FIG. 4).

If the rollover takes place, however, the tire changes into a positive camber state in relation to the road surface, and the protruding ends 5*d* contact the road. As the protruding ends 5*d* contact the road instead of the shoulder part 5*c* of the tire, the contact surface of the tire to the road is reduced. When the contact surface of the protruding ends 5*d* increases, the contact surface of the tire to the road reduces in comparison to tires with no protruding ends 5*d*. Once the contact surface of the tire to the road surface is reduced by the protruding ends 5*d*, the lateral force of the tire is also reduced and the rollover is stabilized.

As apparent from the foregoing, there is an advantage in the rollover protecting system for a vehicle in that the outer wheel of the vehicle becomes a negative camber in relation to the vehicle body and is perpendicular to the road surface when the vehicle makes a slow turn, thereby increasing a contact surface of the tire and stabilizing steering by sufficient lateral forces of the tire. There is another advantage in that the outer wheel becomes a positive camber in relation to the road surface, and protruding ends formed at a constant interval contact the road when the vehicle makes a sharp turn thereby reducing a contact surface of the tire as well as lateral forces of the tire, contributing to a stabilization of the rollover.

What is claimed is:

1. A rollover protecting system for a vehicle, comprising:

a plurality of sensors sensing a state of a vehicle;

an electronic control unit (ECU) calculating a roll angle of a vehicle by using values inputted from said plurality of sensors;

an actuator activated by said ECU and adjusting a tire to a positive camber when said ECU detects an occurrence of a rollover; and protruding ends formed on a shoulder part of the tire for contacting a road surface and reducing a lateral force on the tire when the tire is adjusted to the positive camber, wherein each of said protruding ends comprises a ring shape around said shoulder part, and said protruding ends are aligned in plural rows at a constant interval and slopingly protrude out from said shoulder part toward the road surface.

2. The system as defined in claim 1, wherein said actuator comprises a moving part linearly sliding in relation to a fixed part, said fixed part pivotally mounted to a vehicle body at an upper side of a lower arm; and the system further comprises a pivot arm, said pivot arm comprising:

a first end pivotally coupled to said moving part of said actuator;

a second end pivotally connected to an end of a vehicle body side of an upper arm; and a mid-part pivotally fastened to the vehicle body.

3. The system as defined in claim 1, wherein:

each of said protruding ends comprises a lateral side that increases in length from a tread of said tire toward a side wall of said tire; and said protruding ends that are formed at said side wall are longer than those formed at said tread.

* * * * *